US007088925B1

(12) United States Patent
Noe

(10) Patent No.: US 7,088,925 B1
(45) Date of Patent: Aug. 8, 2006

(54) DEVICE FOR DETECTING POLARIZATION MODE DISPERSION

(75) Inventor: Reinhold Noe, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/019,526

(22) PCT Filed: Apr. 14, 2000

(86) PCT No.: PCT/DE00/01175

§ 371 (c)(1),
(2), (4) Date: Dec. 27, 2001

(87) PCT Pub. No.: WO01/01612

PCT Pub. Date: Jan. 4, 2001

(30) Foreign Application Priority Data

Jun. 28, 1999 (DE) ................................ 199 29 673

(51) Int. Cl.
*H04B 10/12* (2006.01)
(52) U.S. Cl. .................. 398/147; 398/29; 398/208
(58) Field of Classification Search ............... 398/147, 398/148, 149, 150, 29, 152, 65, 184, 205, 398/158, 159, 160, 161, 208
See application file for complete search history.

(56) References Cited

U.S. PATENT DOCUMENTS

| 4,933,634 A | * | 6/1990 | Cuzin et al. ................. 324/102 |
| 4,973,969 A | * | 11/1990 | Jenson ........................ 342/189 |
| 5,144,525 A | * | 9/1992 | Saxe et al. ..................... 365/45 |
| 5,528,637 A | * | 6/1996 | Sevenhans et al. ......... 375/371 |
| 5,654,793 A | * | 8/1997 | Barlow et al. ............. 356/73.1 |

FOREIGN PATENT DOCUMENTS

| DE | 40 14 767 A1 | 11/1991 |
| DE | 195 38 310 A1 | 4/1997 |
| EP | 0 863 626 A2 | 9/1998 |
| EP | 0 909 045 A2 | 4/1999 |
| EP | 0 964 237 | 12/1999 |
| GB | 2 332 317 | 6/1999 |
| WO | WO 99/28723 | 6/1999 |

OTHER PUBLICATIONS

Digital Communication, Lee et al.
XP 002126317 Electronic Equalisation of PMP and Chromatic Dispersion Induced Distortion After 100 km Standard Fibre at 10 Gbit/s, Schlump et al.

* cited by examiner

*Primary Examiner*—Christina Y. Leung
(74) *Attorney, Agent, or Firm*—Bell, Boyd & Lloyd LLC

(57) ABSTRACT

Device for detecting polarization mode dispersion of an optical data signal, which has at least one EXOR gate together with an averaging device for measuring at least one value of the autocorrelation function of a baseband signal distorted by polarization mode dispersion.

16 Claims, 5 Drawing Sheets

_DEVICE FOR DETECTING POLARIZATION MODE DISPERSION_

BACKGROUND OF THE INVENTION

Long optical waveguide transmission links are used in optical transmission technology. Production dictates that the optical waveguides are not completely isotropic, but rather weakly birefringent. The long transmission link results in frequency-dependent polarization transformation, called polarization mode dispersion or polarization dispersion, abbreviated to PMD. Through the change in the polarization of the optical signal as a function of the optical frequency and, associated therewith, different frequency-dependent delays, this PMD leads to the widening of transmitted pulses. As such, at the receiving end, the identifiability of the pulses is reduced and, as a result, the transmitted data rate is limited. The term "principal states of polarization", referred to as PSP below, designates those two states of polarization which are orthogonal to one another and to a first approximation do not change when the optical frequency changes. In polarization-maintaining optical waveguides, the principal states of polarization coincide with the principal axes; in other words, are horizontal and vertical. In general, however, the principal states of polarization are arbitrary orthogonal pairs of elliptic states of polarization. The principal states of polarization have different group delays, whose difference is referred to as "differential group delay", DGD below. If an optical signal is transmitted with one principal state of polarization, then, to a first-order approximation, no pulse widening takes place. If it is transmitted with a polarization which, in the case of splitting according to the two principal states of polarization, corresponds to power components that are identical there, maximum pulse widening occurs because two pulses of identical strength, with delay differences equal to DGD, are superposed. If the principal states of polarization change as a function of the optical frequency, then it is the case, however, that, when a principal state of polarization which corresponds to a specific frequency is used on the input side, the output state of polarization will nevertheless change as a function of the frequency, but actually only in a higher order than the first order. This is referred to as higher-order PMD. Higher-order PMD generally occurs, although first-order PMD is predominant due to its effects and, therefore, must be compensated preferentially. This is aggravated by the fact that the transmission response of the link, and hence the PMD too, changes as a result of temperature change or mechanical stress. Therefore, use is made of adaptive PMD compensators which are inserted in the transmission path. To drive these compensators, PMD distortions must be detected in the optical receiver. The compensator can then be set optimally using a gradient algorithm, for example.

In Electronic Letters, Feb. 17, 1994, Volume 30, no. 4, pages 348 to 349, use is made of a bandpass filter for filtering a data signal whose PMD is to be detected. A power detector at the filter output supplies a signal which is higher, the smaller the PMD distortions are. In Electron. Lett. 34(1998) 23, pages 2258 to 2259, use is made of a combination of a number of bandpass filters with downstream power detectors, in which case, instead of individual signals, it is also possible to use a linear combination of the signals. By using bandpass filters having different center frequencies, it becomes possible, at the same time, to detect even relatively large PMD distortions which exceed, e.g., a bit duration of the signal. However, bandpass filters are poorly suited to monolithic integration; for example, in Si or SiGe. Moreover, unavoidable group delay distortions in the bandpass filters have the result that optimal PMD detection and hence equalization is not possible.

In Proceedings OEC 94, 14e-12, pages 258 to 259, Makuhari Trade Fair, Japan 1994, a different method is used, in which the power of the differential signal between decision-circuit output and decision-circuit input is evaluated. Incorrect decisions may occur, however, particularly in the event of severe PMD distortions in which the DGD exceeds the bit duration, so that the signal obtained in such cases is an unsuitable criterion for the presence of PMD distortions.

An object of the present invention, therefore, is to specify a reliable detector even for relatively large values of the differential group delay which can be integrated in a simple manner and, unlike bandpass filters, is not subject to intrinsic distortions through group delay distortions.

SUMMARY OF THE INVENTION

According to the present invention, use is made of EXCLUSIVE-OR gates (EXOR) or multipliers, which are used to determine essential parts of the autocorrelation function of the baseband signal present in the electrical part of an optical receiver. A particular advantage of the present invention is that EXOR gates can be monolithically integrated in a simple manner.

With EXOR gates which are separated by delay lines, the autocorrelation function values are produced for different time delays.

In an advantageous exemplary embodiment, two delay lines that are to be traversed in opposite directions are used, which can be implemented in a particularly space-saving manner and, moreover, at least approximately compensate the line losses.

Additional features and advantages of the present invention are described in, and will be apparent from, the following Detailed Description of the Invention and the Figures.

DETAILED DESCRIPTION OF THE FIGURES

Figure 1:
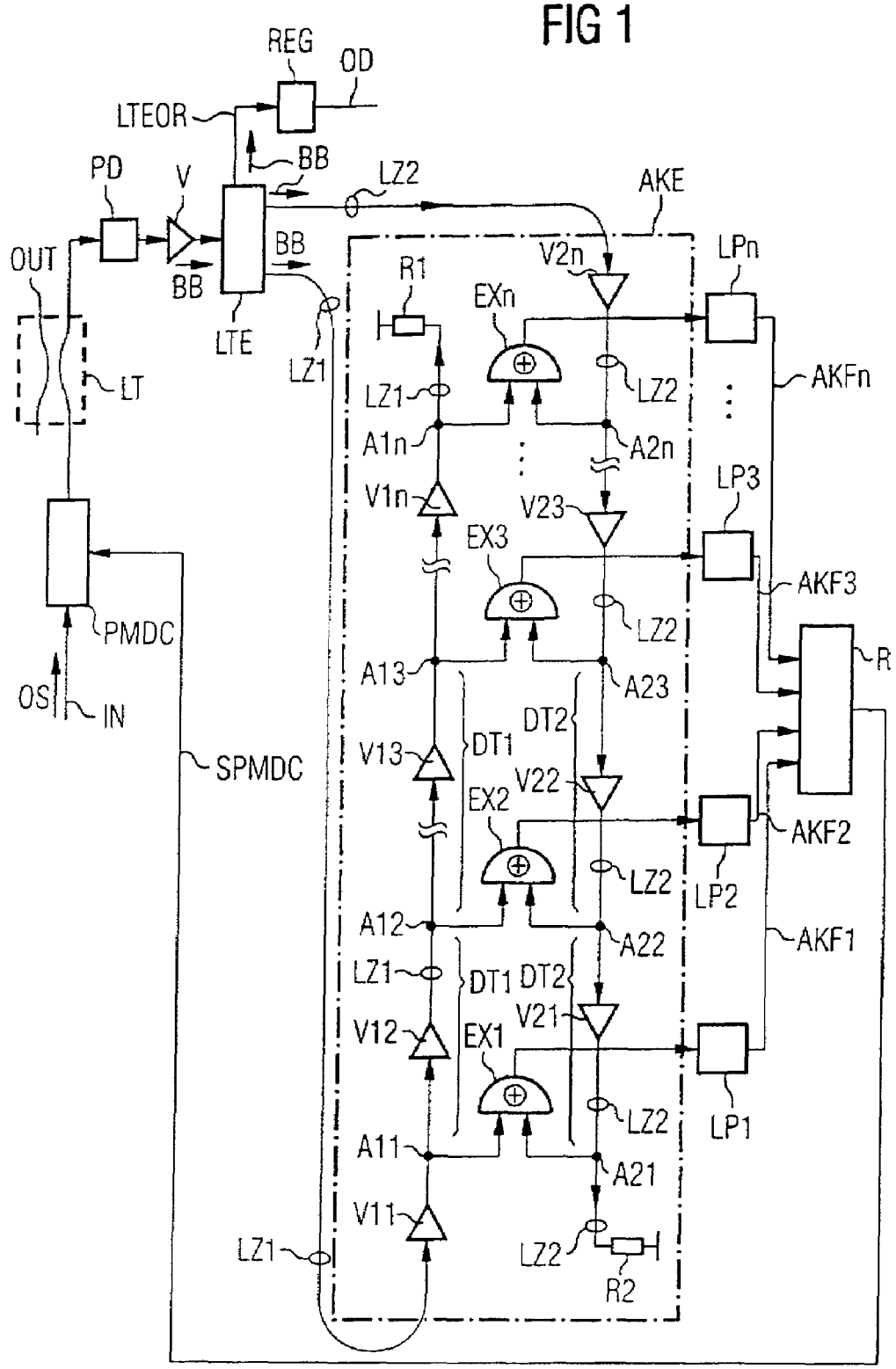
FIG. 1 shows a device according to the present invention for PMD detection, supplemented by PMD compensator and further assemblies.

FIG. 1 shows a system for optical PMD compensation having an optical input IN and an optical output OUT. An optical wave OS, coming from the input IN, traverses firstly an adjustable optical PMD compensator PMDC and then a power divider LT. One output of the power divider forms the optical output OUT of the system and the other drives a photodiode PD. After electrical amplification in amplifier V, the baseband signal BB is fed to an electrical power divider LTE.

The outputs of the electrical power divider are fed to two tapped delay lines LZ1, LZ2. The ends of the delay lines are provided with terminating resistors R1, R2 in accordance with the characteristic impedance. A tap $A1j$ ($j=1 \ldots n$) of the line LZ1 is respectively fed to one input and a tap $A2j$ ($j=$ 1 . . . n) of the line LZ2 is respectively fed to the other input of an EXOR gate EXj (j=1 . . . n).

Instead of EXOR gates, any other multiplier circuits are also suitable. Gilbert multipliers are particularly suitable as EXOR gates/multipliers. A suitable circuit, in this case with field-effect transistors, is presented, for example, in Electronics Letters, Aug. 15, 1991, Volume 27, no. 17, pages 1529 to 1532, to be precise in FIG. 3 therein.

The taps are arranged according to a rising index j on one of the lines (LZ1) and according to a falling index j on the other line (LZ2). The result of this is that the delay difference between the signals at the inputs of an EXOR gate EXj changes monotonically with rising index j. If the line lengths between all the adjacent taps of a respective line are equal, then equidistant delay differences which change monotonically in accordance with index j are produced. Low-pass filters LPj (j=1 . . . n) are respectively connected to the outputs of the EXOR gates EXj. Instead of low-pass filters, other circuits which can be used for averaging, such as integrators, for example, which integrate over a defined time duration, are also suitable. These are also referred to as "Integrate-and-Dump" circuits. The output signals of the low-pass filters specify the values of the autocorrelation function of the electrical signal BB which are measured for different delay differences.

In order to compensate the losses at the taps A1j, A2j, to suppress multiple reflections on the delay lines LZ1, LZ2 and to obtain a longer signal delay for given dimensions, buffer amplifiers V1j, V2j(j=1 . . . n) may be inserted into the delay lines LZ1, LZ2. However, they are not absolutely necessary.

Since balanced circuitry with differential inputs and push-pull outputs affords numerous advantages, it is favorable to use it here, too. By way of example, amplifier V, power divider LTE, delay lines LZ1, LZ2, buffer amplifiers V1k, V2k, taps A1j, A2j, terminating resistors R1, R2, EXOR gates EXj and low-pass filters LPj may be of balanced design. The last-mentioned literature reference describes how this is done for, e.g., an EXOR gate.

EXOR gates EXj and at least parts of the delay lines LZ1, LZ2 including taps A1j, A2j and terminating resistors R1, R2 and, if present, buffer amplifiers V1k, V2k form an autocorrelation unit AKE. The latter may, for example, also include the remainder of the delay lines LZ1, LZ2, the electrical power divider LTE and the amplifier V. An autocorrelation unit AKE1 can be monolithically integrated in a space-saving manner on a semiconductor chip; e.g., in SiGe, GaAs or InP.

In practice, the taps give rise to losses on the delay lines LZ1, LZ2. However, since the input signals of all the EXOR gates traverse, in total, the same number of taps, i.e. upon addition of the traversed taps on line LZ1 and the traversed taps on LZ2, and, given a suitable design, also traverse line portions that are of the same length, in total, the product of the attenuation factors which these input signals experience is constant. This is true even in the absence of buffer amplifiers V1k, V2k. This advantageously has the result that the output signals of the different EXOR gates EXj correspond, with at least approximately the same proportionality factor, proportionally to the value of the autocorrelation function which corresponds to the respective delay.

In the exemplary embodiment of FIG. 1, the signal delays between the outputs of the electrical power divider LTE and the taps A11 and A21 respectively, shall be identical. In this way, the value AKF1 of the autocorrelation function of the baseband signal BB for delay zero is produced at the output of the low-pass filter LP1. Between adjacent tap points A1k and A1(k+1) (k=1 . . . n-1) the signal delays shall be identical and have the value DT1. Between respectively adjacent tap points A2(k+1) and A2k(k=1 . . . n-1), the signal delays shall be identical and have the value DT2. Since the delay lines LZ1, LZ2 are traversed in opposite directions in the region of the EXOR gates, the value AKF2, AKF3, . . . AKFn of the autocorrelation function of the baseband signal BB for delays DT, 2*DT, . . . , (n-1)*DT, where DT=DT1+DT2, is respectively produced at the outputs of the remaining low-pass filters LP2 . . . LPn. In order to minimize the chip area, it is advantageous to choose DT1=DT2. It is furthermore favorable to choose DT to be equal to or shorter than a symbol duration T of the baseband signal BB. In the case of the binary signals usually used, a symbol duration T is equal to a bit duration. Since the autocorrelation function of a real signal has even symmetry, it is possible to dispense with the measurement of the values of the autocorrelation function with opposite delays. The maximum delay (n-1)*DT should, if possible, be at least equal to the sum of a differential group delay, caused by PMD, of the optical transmission link and the differential group delay generated by the PMD compensator PMDC.

Figure 2:
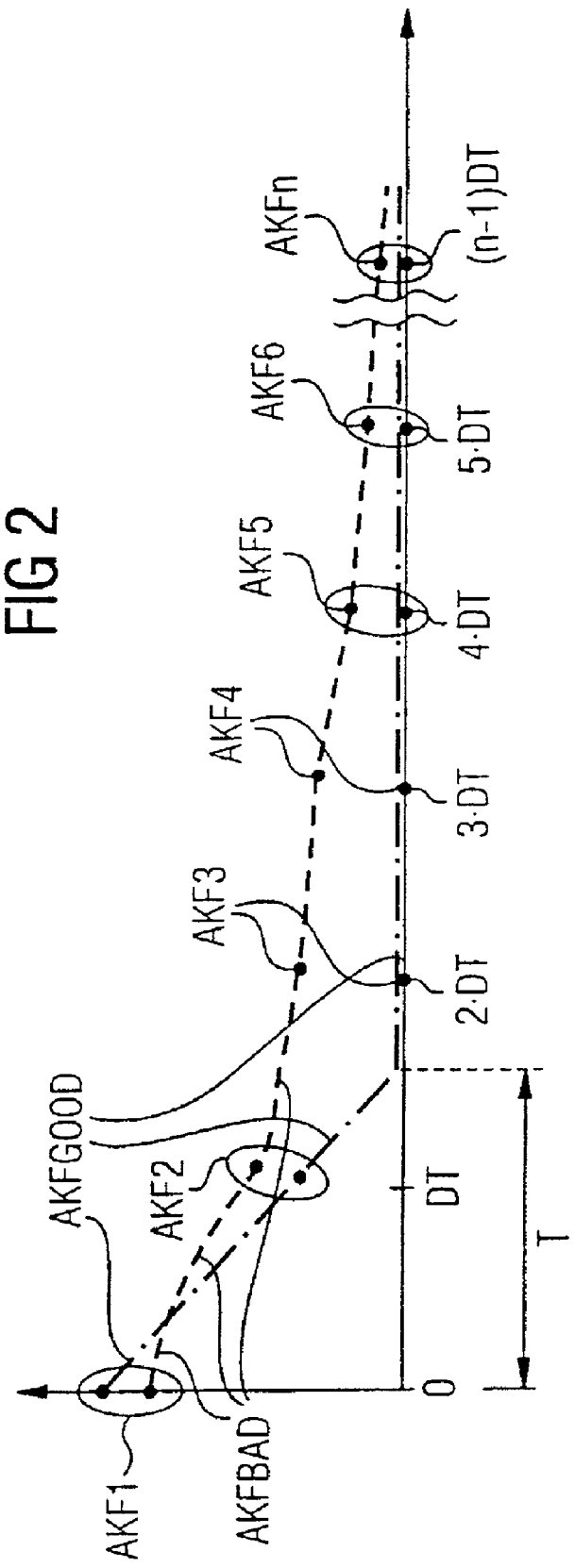
FIG. 2 shows a poor and a good sampled autocorrelation function.

The outputs of the low-pass filters LBj are fed to a regulator R. An autocorrelation function AKF sampled by values AKF1 . . . AKFn is thus present here. If PMD is present and is not equalized, the value AKF1 is often smaller than the maximum possible value and the values AKF2 . . . AKFn differ from zero even when they correspond to delays DT . . . (n-1)*DT greater than a symbol duration T of the baseband signal. Such a poor autocorrelation function AKF-BAD is shown by FIG. 2. Only half of the autocorrelation function is shown since, after all, the autocorrelation function is symmetrical, so that measurement of the other half is unnecessary.

The regulator R adjusts the control signals SPMDC of the PMD compensator PMDC in such a way that the autocorrelation function is at least approximately equal to the autocorrelation function of the undistorted baseband signal. In the case of NRZ signals, this is a triangular pulse centered about delay zero, which pulse reaches the value zero for a delay of one bit duration T and remains there for longer delays. Such a good autocorrelation function AKFGOOD is also shown by FIG. 2. In this case, the value AKF1 is maximal and the values AKF2 . . . AKFn are at least approximately equal to zero when the delays DT . . . (n-1)*DT are at least as long as a symbol duration T of the baseband signal. This applies to the values 2*DT . . . (n-1)*DT in FIG. 2. PMD is ideally equalized in this case. An ideally equalized optical signal therefore appears at the optical output OUT.

The optical power divider LT can also be omitted, so that the PMD compensator PMDC is directly connected to the photodiode PD on the output side. In this case, the electrical power divider LTE, as shown in FIG. 1, should have a further electrical output LTEOR. An electrical data regenerator (often called 3R regenerator) REG is connected to the electrical output LTEOR. A regenerated data signal which at least approximately has no bit errors through PMD is available at the output OD of the regenerator.

Figure 3:
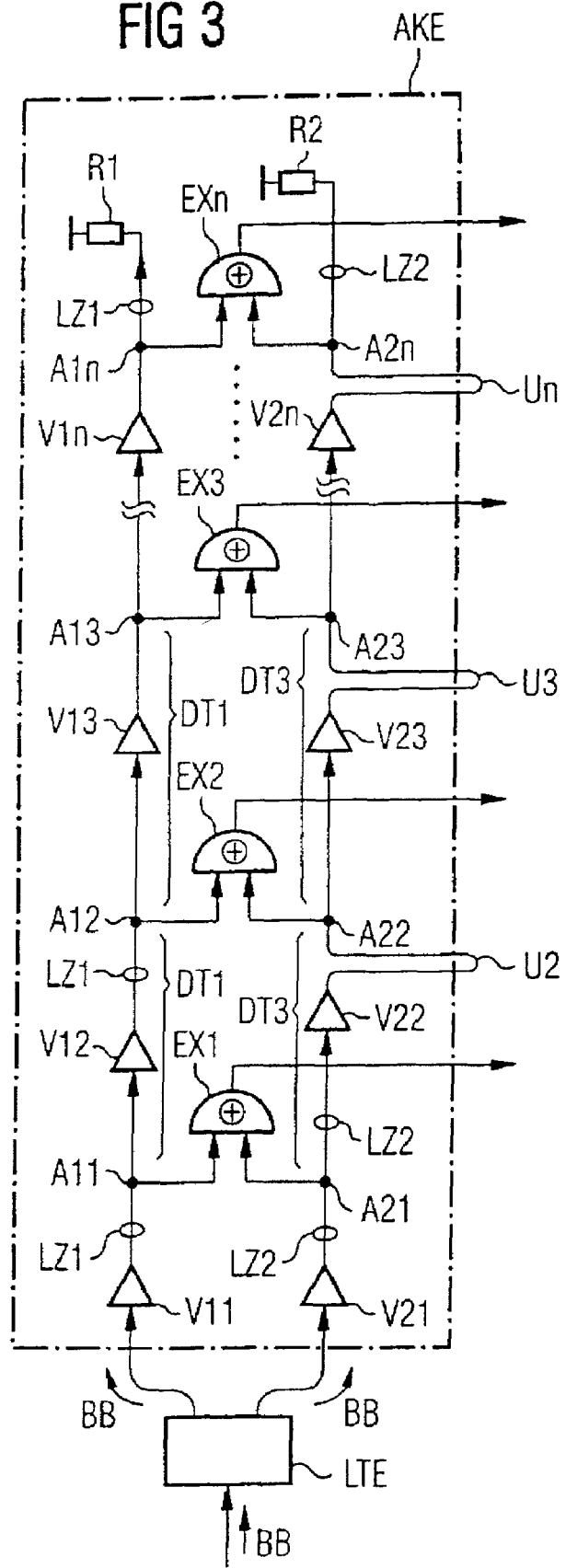
FIG. 3 shows a further exemplary embodiment of a device for PMD detection.

FIG. 3 shows a further exemplary embodiment of the device for PMD detection. Only the autocorrelation unit AKE of FIG. 1 and a power divider LTE are shown here. In FIG. 3, the signal flow directions of the delay lines LZ1, LZ2 along the EXOR gates are not opposite, as in FIG. 1, but rather unidirectional. This can be seen also from the opposite positioning of the terminating resistor R2 and the opposite orientation of the buffer amplifiers V2j. As in FIG. 1, buffer amplifiers are not absolutely necessary, or may be provided, e.g., only at some points.

In FIG. 3, time delay DT1 shall be defined in the same way as in FIG. 1. Between respectively adjacent tap points A2k and A2(k+1) (k=1 . . . n–1) of FIG. 3, the signal delays shall be identical and have the value DT3. The delay differences between the inputs of successive correlators are therefore 0, DT, 2*DT . . . (n–1)*DT where DT in this case has the value DT=DT1–DT3. In order to obtain different DT1, DT3, detour lines Um (m=2 . . . n) are provided.

Figure 4:
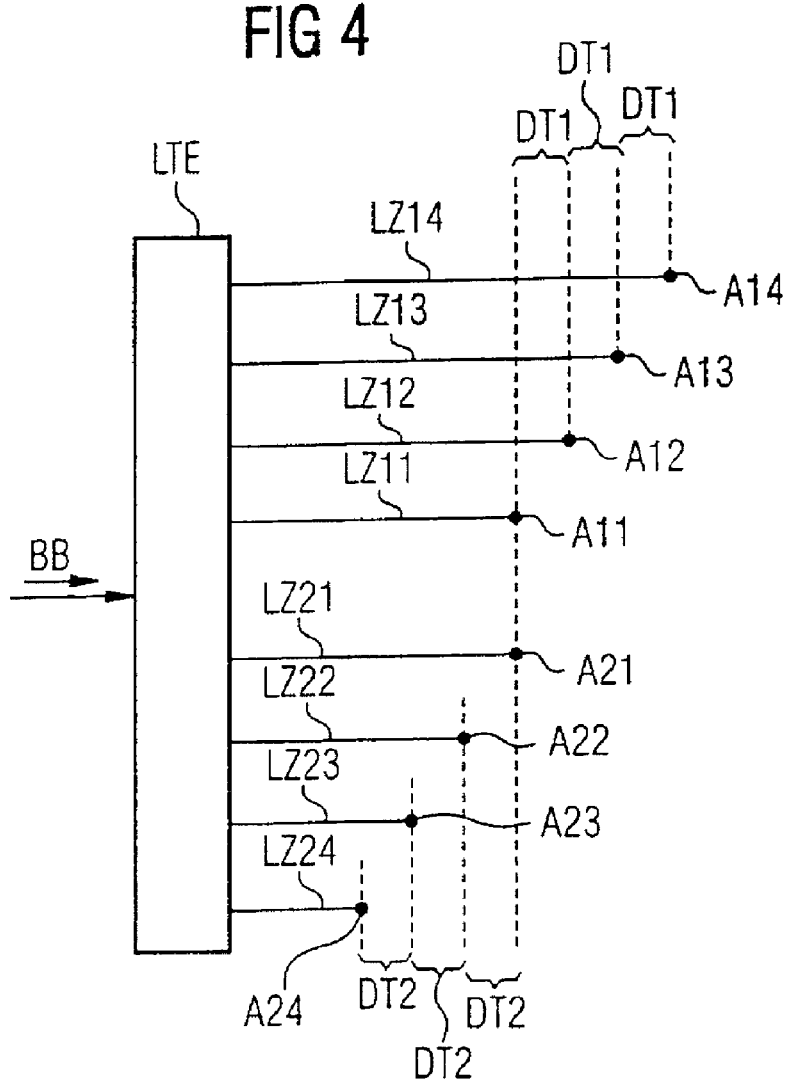
FIG. 4 shows a variant of delay lines.

Instead of tapped delay lines LZ1, LZ2, it is also possible to use a number of delay lines LZ1j, LZ2(j=1 . . . . n) of different lengths. To that end, the power divider LTE must have a corresponding number of outputs. A suitable exemplary embodiment where n=4 is sketched in FIG. 4. The delay lines LZ1j, LZ2j end at those points A1j, A2j which are connected to the EXOR gate inputs and were the tap points in FIGS. 1 and 2. The delay differences between the point pairs (A11, A21), (A12, A22), (A13, A23), (A14, A24) are 0, DT, 2*DT and 3*DT, respectively, where DT=DT1+DT2.

Figure 5:
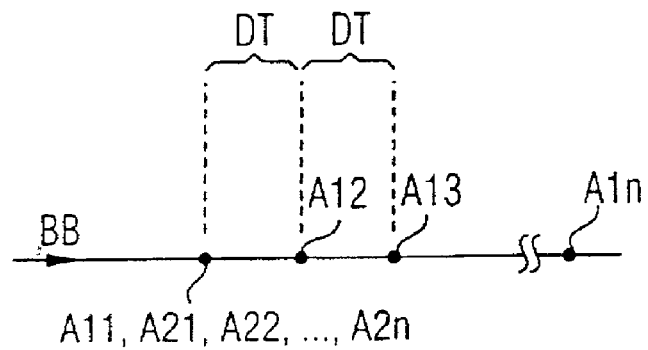
FIG. 5 shows a further variant of a delay line.

FIG. 5 illustrates part of an exemplary embodiment with only one delay line LZ1. The points A1j, which are connected to one EXOR gate input in each case, are strung along the delay line LZ1. The points A2j, which are connected to the other EXOR gate input in each case, all coincide and are identical to the point A11. Delay differences 0, DT, 2*DT . . . (n–1)*DT between the EXOR gate inputs are obtained in this way.

Figure 6:
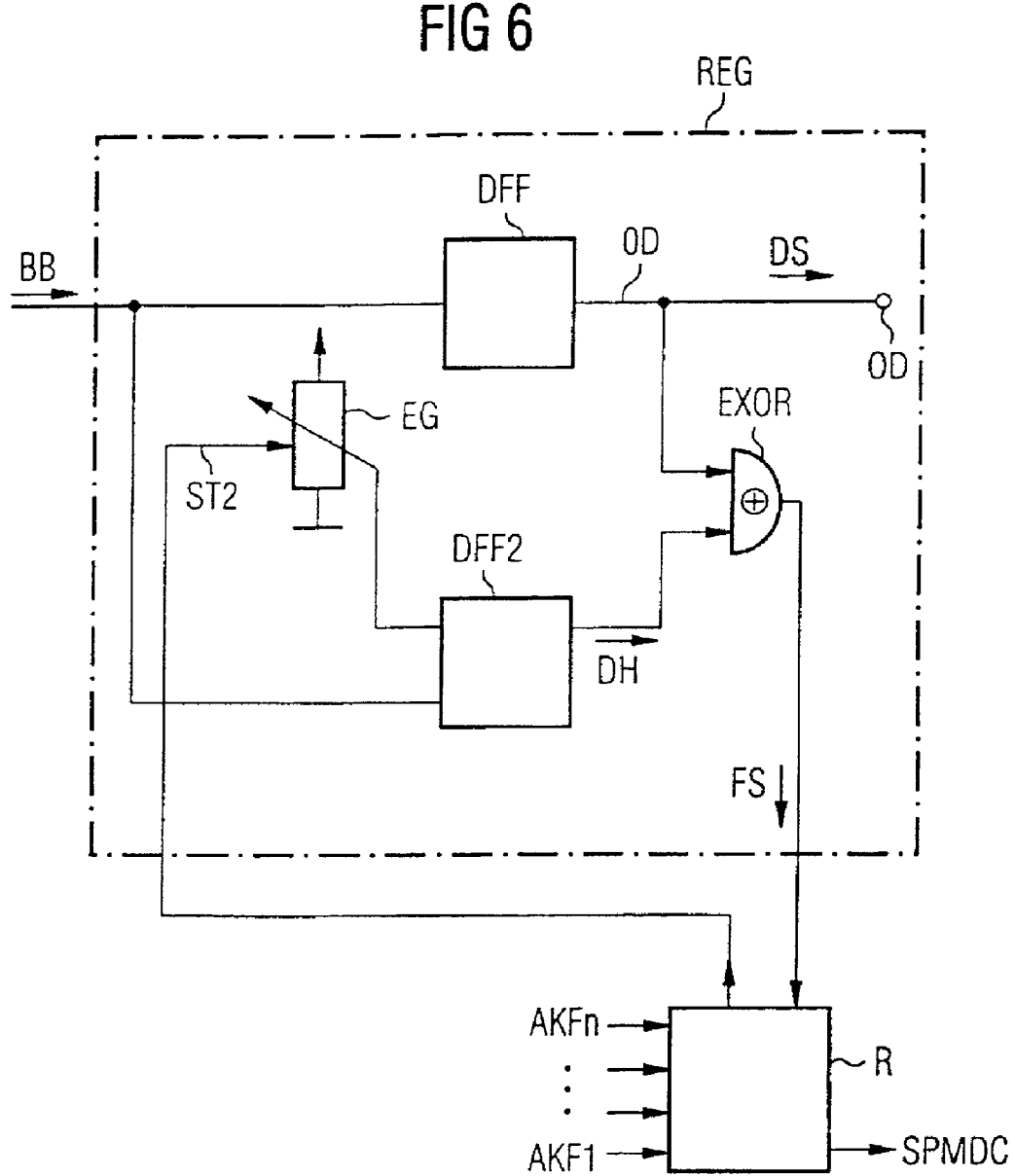
FIG. 6 shows a regenerator connected to a regulator.

In order to achieve an optimally low bit error rate, it is expedient for a measure of this bit error rate to be made available to the regulator R. This is possible in a simple manner if an electrical regenerator REG is provided. It may, therefore, be expedient to provide a regenerator REG even in cases where power divider LT and optical output OUT of the equalized optical signal are present. FIG. 6 illustrates the regenerator REG. Clock recovery is generally necessary but is not illustrated here for reasons of clarity. The regenerated data signal DS appears at the output OD, which is also the output of a D flip-flop DFF, to which the baseband signal BB is fed on the input side. The baseband signal is likewise fed to a second decision circuit (D flip-flop) DFF2. In this exemplary embodiment, the threshold of the decision circuit can be adjusted via a setting device EG to such an extent that the decision circuit already yields a data auxiliary signal DH affected by errors when the first decision circuit DFF still outputs an essentially error-free data signal DS. The output signals are compared with one another in an EXCLUSIVE-OR gate EXOR, and the error signal FS thus obtained is likewise fed to the regulator R for controlling the PMD compensator PMDC. A measure of how good the signal quality is with regard to a bit error rate that can be achieved is continuously developed by shifting the threshold of the second decision circuit via a setting device EG, which is controlled by the regulator R via a control signal ST2. The lower the error rate of the data auxiliary signal when the threshold is shifted from the optimum, the better the signal quality. Roughly, a maximum value of the autocorrelation function AKF1 for delay zero and zero values of the autocorrelation function for delays which are longer than a symbol duration T will also produce a minimum bit error rate. By contrast, a more accurate assessment which leads to a lower bit error rate of the decision circuit DFF is produced when the error signal FS is used. Since deviations of the data auxiliary signal DH from the data signal DS occur stochastically, however, a relatively long measurement or averaging time of the error signal FS is necessary in order to obtain a particularly good signal/noise ratio and, hence, optimal compensation. The additional information obtained with the aid of the second decision circuit is used to adaptively modify the regulating algorithm of the regulator R, which performs the setting of the PMD compensator PMDC with the aid of autocorrelation function measured values AKF1, AKF2 . . . AKFn. By way of example, a slightly negative value AKF3 might be more favorable than the value zero. This adaptive form of operation appears to be particularly favorable for making manufacturing tolerances, temperature fluctuations, occurrence of nonlinear effects, etc., tolerable. The major advantage of these embodiments is that, through the measured values of the autocorrelation function, rapid PMD compensation is already possible and sufficient time is available for the fine setting and the setting of the transfer function of the filter.

However, it is also possible to use only an error signal FS, particularly in cases where fast setting of the PMD compensator PMDC is not important. In this case, electrical power divider LTE and autocorrelation unit AKE and low-pass filters LPj may be omitted.

Although the present invention has been described with reference to specific embodiments, those of skill in the art will recognize that changes may be made thereto without departing from the spirit and scope of the invention as set forth in the hereafter appended claims.

The invention claimed is:

1. A device for detecting polarization mode dispersion of an optical data signal by evaluating an electrical baseband signal, comprising:
   a polarization mode dispersion compensator;
   at least one multiplier which calculates a value of an autocorrelation function of the baseband signal by multiplication of a value of the baseband signal by a delayable value of the baseband signal, wherein the value of the autocorrelation function indicates the presence of polarization mode dispersion;
   an averaging device for averaging the calculated value of the autocorrelation function; and
   a regulator for controlling the PMD compensator using the autocorrelation function.

2. A device for detecting polarization mode dispersion of an optical data signal as claimed in claim 1, further comprising:
   a delay line with taps, wherein taps with different delays are respectively connected to inputs of the at least one multiplier.

3. A device for detecting polarization mode dispersion of an optical data signal as claimed in claim 2, wherein two delay lines are provided through which, in a region in which the two delay lines exhibit a mutual assignment via the inputs of the at least one multiplier, the baseband signal runs in opposite directions such that the delays occurring between adjacent multipliers are added to form a delay difference between the adjacent multipliers.

4. A device for detecting polarization mode dispersion of an optical data signal as claimed in claim 2, wherein two delay lines are provided which, in a region in which the two delay lines exhibit an assignment via the inputs of the at least one multiplier, are traversed in a same direction such that the delays occurring between adjacent multipliers are subtracted from one another to form a delay difference between the adjacent multipliers.

5. A device for detecting polarization mode dispersion of an optical data signal as claimed in claim 2, wherein delays that occur are equidistant with a constant delay difference.

6. A device for detecting polarization mode dispersion of an optical data signal as claimed in claim 2, wherein a delay difference is at least approximately equal to a symbol duration of the baseband signal.

7. A device for detecting polarization mode dispersion of an optical data signal as claimed in claim 1, further comprising:
a plurality of delay lines of different lengths to whose ends inputs of multipliers are connected.

8. A device for detecting polarization mode dispersion of an optical data signal as claimed in claim 7, further comprising:
a detour line provided in one of the delay lines.

9. A device for detecting polarization mode dispersion of an optical data signal as claimed in claim 7, further comprising:
a buffer amplifier in one of the delay lines.

10. A device for detecting polarization mode dispersion of an optical data signal as claimed in claim 1, wherein the regulator at least approximately maximizes a non-delayed value of the autocorrelation function and adjusts values of the autocorrelation function that are delayed by at least one symbol duration at least approximately to the value zero.

11. A device for detecting polarization mode dispersion of an optical data signal as claimed in claim 1, further comprising:
a measuring arrangement for measuring a bit error rate in the event of one of an intentionally impaired reception signal and a changed threshold value of a second decision stage, an error signal of the measuring arrangement further controlling the polarization mode dispersion compensator via the regulator.

12. A device for detecting polarization mode dispersion of an optical data signal as claimed in claim 11, wherein the regulator is used additionally for adaptively setting the values of the autocorrelation function that are sought.

13. A device for detecting polarization mode dispersion of an optical data signal as claimed in claim 1, wherein the multiplier is an EXOR gate.

14. A device for detecting polarization mode dispersion of an optical data signal as claimed in claim 1, where the multiplier is a Gilbert multiplier.

15. A device for detecting polarization mode dispersion of an optical data signal by evaluating an electrical baseband signal, comprising:
at least one multiplier which calculates a value of an autocorrelation function of the baseband signal by multiplication of a value of the baseband signal by a delayable value of the baseband signal, wherein the value of the autocorrelation function indicates the presence of polarization mode dispersion;
a delay line with taps, wherein taps with different delays are respectively connected to inputs of the at least one multiplier, and wherein a delay difference is at least approximately equal to a symbol duration of the baseband signal; and
an averaging device for averaging the calculated value of the autocorrelation function.

16. A device for detecting polarization mode dispersion of an optical data signal by evaluating an electrical baseband signal, comprising:
a polarization mode dispersion compensator;
a regulator, communicatively coupled to the polarization mode dispersion compensator
at least one multiplier which calculates a value of an autocorrelation function of the baseband signal by multiplication of a value of the baseband signal by a delayable value of the baseband signal, wherein the value of the autocorrelation function indicates the presence of polarization mode dispersion;
an averaging device for averaging the calculated value of the autocorrelation function; and
a measuring arrangement for measuring a bit error rate in the event of one of an intentionally impaired reception signal and a changed threshold value of a second decision stage, wherein an error signal of the measuring arrangement is used by the regulator to control the polarization mode dispersion compensator.

* * * * *